United States Patent
Holzman et al.

(10) Patent No.: US 6,685,407 B1
(45) Date of Patent: Feb. 3, 2004

(54) CONNECTING ELEMENT COMPRISING TWO MEMBERS

(75) Inventors: Jean-Paul Holzman, Niedersoulzbach (FR); Jean-Luc Klein, Ringendorf (FR)

(73) Assignee: TRW Carr France (FR)

( * ) Notice: Subject to any disclaimer, the term of this patent is extended or adjusted under 35 U.S.C. 154(b) by 0 days.

(21) Appl. No.: 10/019,856

(22) PCT Filed: Mar. 12, 2000

(86) PCT No.: PCT/EP00/02169
§ 371 (c)(1),
(2), (4) Date: Apr. 15, 2002

(87) PCT Pub. No.: WO00/68582
PCT Pub. Date: Nov. 16, 2000

(30) Foreign Application Priority Data

May 10, 1999 (DE) .......................... 199 21 613

(51) Int. Cl.⁷ .......................... F16B 13/04; F16B 13/06
(52) U.S. Cl. .......................... 411/48; 411/41; 411/60.1; 411/908
(58) Field of Search .......................... 411/41, 45, 46, 411/48, 60.1, 908, 510

(56) References Cited

U.S. PATENT DOCUMENTS

| | | | | |
|---|---|---|---|---|
| 5,211,519 A | * | 5/1993 | Saito | 411/48 X |
| 5,375,954 A | * | 12/1994 | Eguchi | 411/48 |
| 5,641,255 A | * | 6/1997 | Tanaka | 411/48 |
| 5,902,083 A | * | 5/1999 | Hwang | 411/48 |

* cited by examiner

*Primary Examiner*—Neill Wilson
(74) *Attorney, Agent, or Firm*—Fay, Sharpe, Fagan, Minnich & McKee, LLP

(57) ABSTRACT

The invention relates to a connecting element between a support, in particular part of a motor vehicle body and a bearing part which is to be fixed onto said support. The connecting element comprises an outer part (1) which can be connected to the bearing part and an inner part (2) which is used in the assembly position to expand at least one section of the outer part (1) behind and/or in an opening of the support. The outer part (1) has an upper flange (10), containing centered internal toothing (11) which can be engaged by counter-toothing (21) in the inner part (2), when in the assembly position. The inner part (2) has at least one catch groove in a catch area between two cylindrical sections. At least one counter-catch of the outer part (1) is inserted into said catch groove in the assembly position.

20 Claims, 3 Drawing Sheets

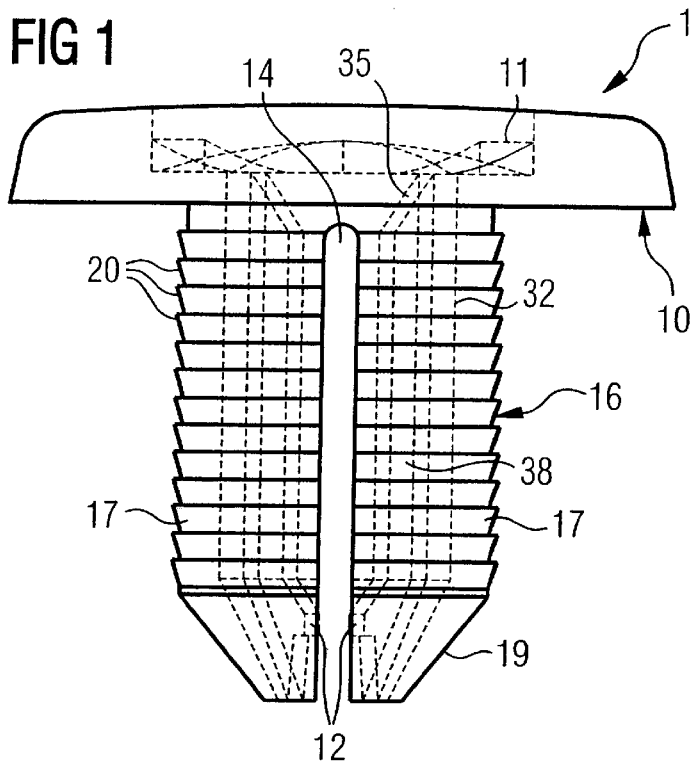
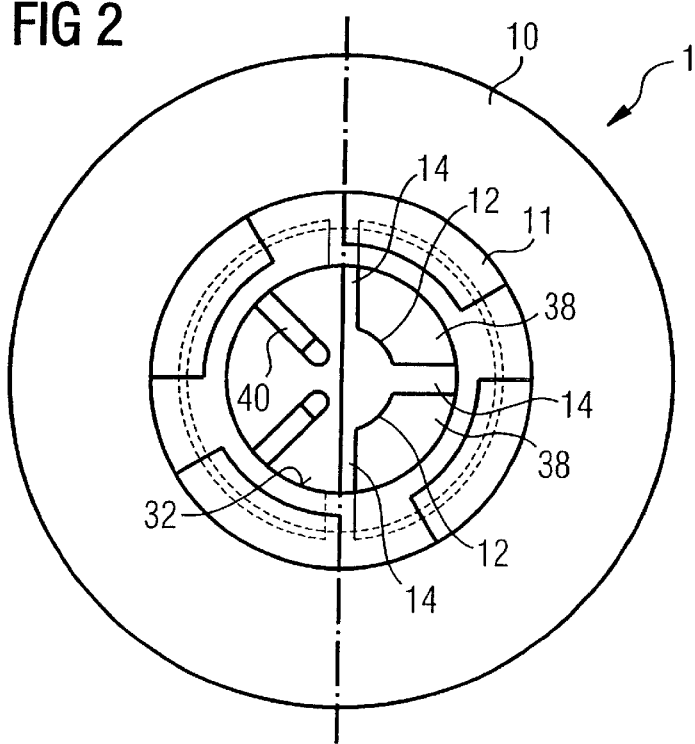

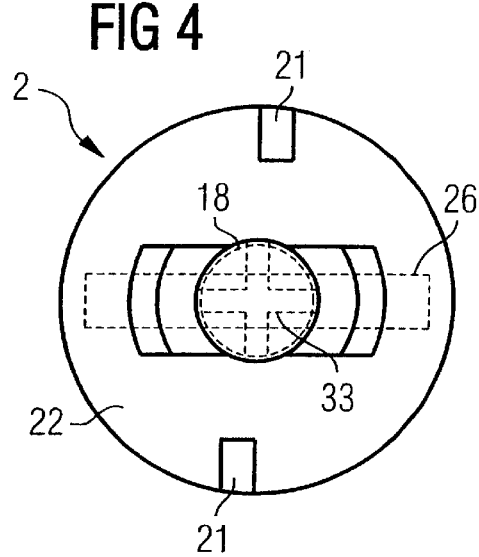
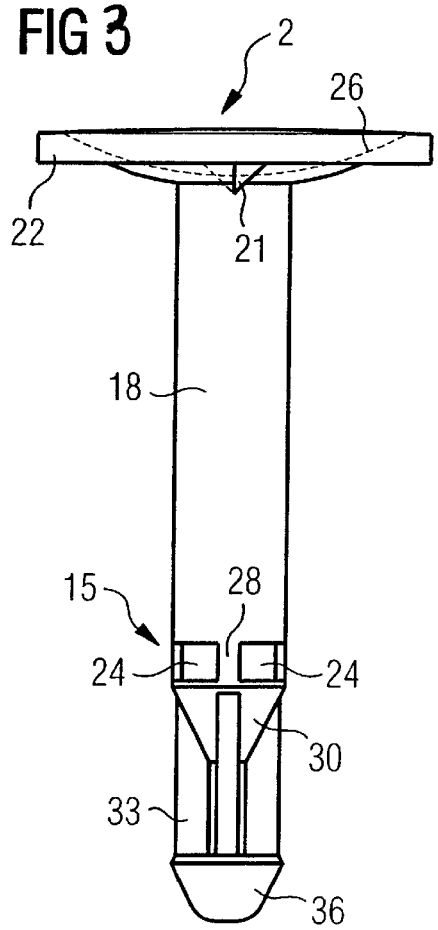

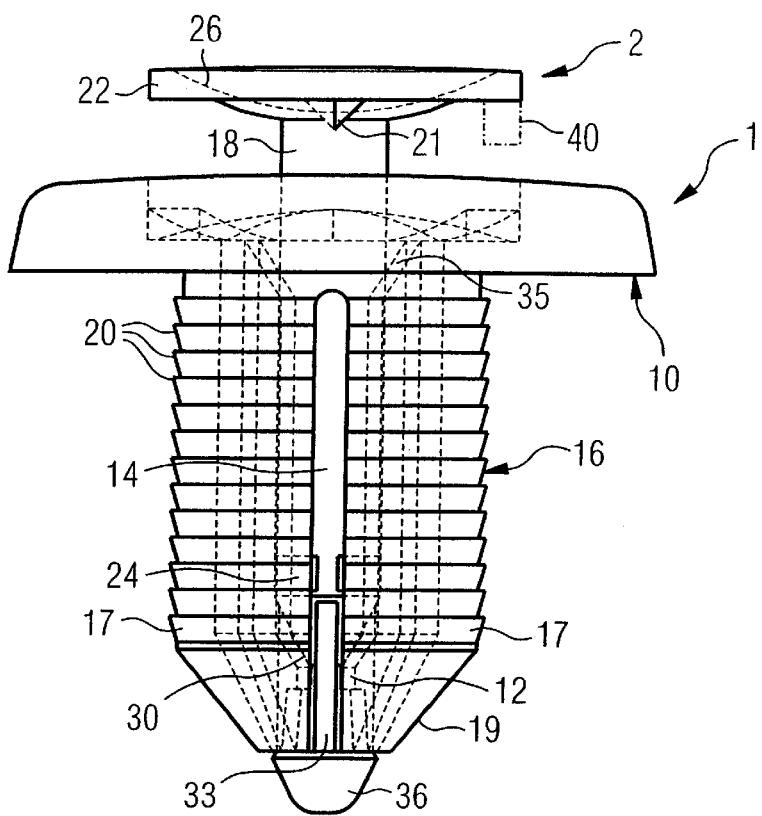
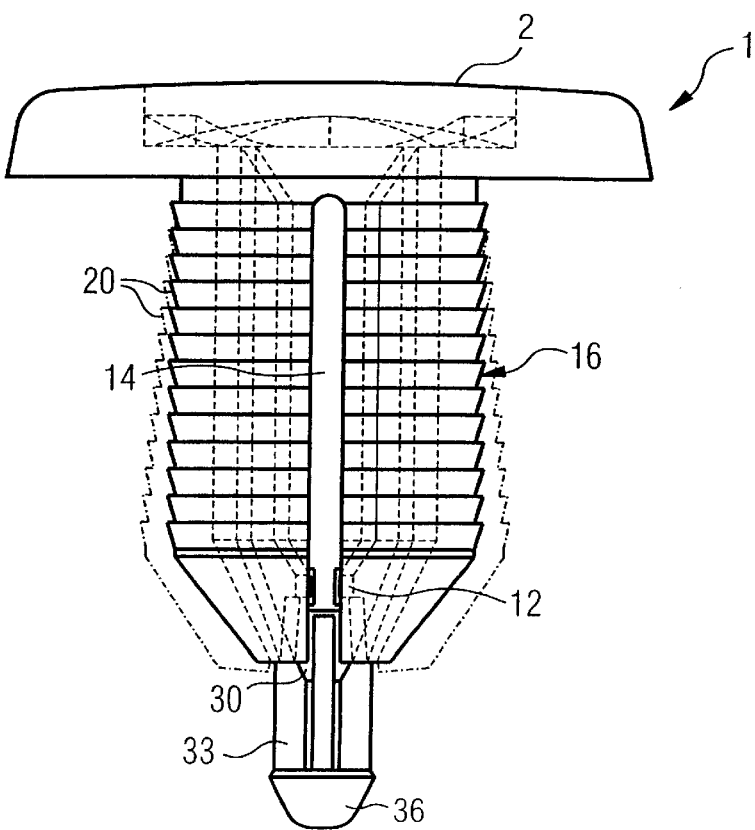

CONNECTING ELEMENT COMPRISING TWO MEMBERS

BACKGROUND OF THE INVENTION

The subject invention is directed toward the art of connecting elements, and more particularly, to a connecting element extending between a support member of a motor vehicle body and a bearing member which is to be affixed onto the support member. The connecting element has an upper member which is connectable with the bearing member and a lower member which penetrates and extends through the upper member. In an assembled configuration, at least one portion of the upper member is expanded behind or within an opening of the support member.

There are several established techniques for connecting motor vehicle body support members and bearing or plate members together. For example, as seen in Patent Application DE 197 53 678.6, a neck-shaped intermediary section is provided between upper and lower parts which penetrate an interior area of an engagement element. The section is embedded into an opening in the support and expands behind the opening in the support. In another technique, a plastic clip is used which establishes a connection by impressing an upper section into a lower section by engagement elements and thereby locks the two sections together. (See Patent Application EP 0415509 A1) A problem with these existing techniques is that it is difficult to loosen the connections once the parts are fastened together without possibly destroying one or more of the connecting elements.

The state of the art described above is therefore limited. There remains a need for a connecting element which can be assembled and disassembled easily without destroying any of the components. Thus, it is desirable to provide a connecting element which allows for easy assembly and disassembly without the need for destroying any connecting members.

SUMMARY OF THE INVENTION

The subject invention provides a connecting element for connecting a support member, in particular a motor vehicle body support member and a bearing member or plate member which is to be fixed onto the support member. The connecting element includes an upper member which is connectable with the bearing member and a lower member which penetrates the upper member. In a preferred embodiment, the upper member has an upper flange with central internal toothing which can be engaged in an assembled position with counter toothing of the lower member. The upper member further has a shaft extending downwardly from the upper flange which has slots. The shaft also has flexible sectors which have outer toothing. Conical sectors are provided on an inside surface of recesses within the shaft which form a narrow region forming a counter catch for receiving the lower member.

The lower member further has a catch region having two cylindrical sectors with at least one recess therebetween which can be embedded within the counter catch of the upper member. As a result, by using an assembly or disassembly tool, the connection formed can be loosened between the upper and lower members and the catch region can exit the counter catch. Thus, it is possible to disengage the connection element from an opening in a support member without causing any damage to the upper and lower members.

In another aspect of the invention, counter toothing of the lower member is located on a bottom side of an upper closing flange which includes at least one engagement recess. The counter toothing is received within the internal toothing of the upper member.

In yet another aspect of the present invention, a cylindrical portion extends from the lower member upper flange in a longitudinal direction. The catch region is formed on a lower end of the cylindrical portion. The catch region can have several catch recesses interposed between cylindrical sectors along the circumference of the catch region. It is preferable to have four cylindrical areas with four catch recesses therebetween.

According to another aspect of the invention, the catch region extends into a transition cone and a region having cross-sectional area in the shape of a cross. The cross-shaped region extends into a conical end of the lower member.

Other aspects of the invention will become apparent upon a reading of the following detailed description.

BRIEF DESCRIPTION OF THE DRAWINGS

The invention may take physical form in certain parts and arrangement of parts, the preferred embodiments of which will be described in detail in the specification and illustrated in the accompanying drawings which form a part hereof, and wherein:

FIG. 1 is a side elevational view of an upper member of a connecting element in accordance with a preferred embodiment of the present invention;

FIG. 2 is a top plan view of the upper member of the connecting element illustrating a first and second preferred embodiment in right and left hand views;

FIG. 3 is a side elevational view of a lower member of the connecting element in accordance with a preferred embodiment of the present invention;

FIG. 4 is a bottom plan view of the lower member of FIG. 3;

FIG. 5 is a side elevational view of the connecting element including the lower member and upper member in a preassembled configuration in accordance with a preferred embodiment of the present invention; and, FIG. 6 is a side elevational view of the connecting element with the lower and upper members in an assembled configuration according to a preferred embodiment of the present invention.

DETAILED DESCRIPTION OF THE PREFERRED EMBODIMENTS

Referring now to the drawings wherein the showings are for the purposes for illustrating the preferred embodiments of the invention only and not for purposes of limiting same, FIG. 1 shows an upper member 1 of a connecting element assembly which is used to connect a support member, such as a support for a motor vehicle body, with a bearing member. The bearing member can be a plate which is attached to the support member. The upper member 1 has an upper flange 10 comprising an internal toothing 11 located within a central portion of the flange. The internal toothing can preferably have a triangular shape in cross section. The upper flange 10 is adjoined by a shaft 16 extending from the flange and which has at least one slot 14 preferably equally spaced on the perimeter of the shaft. The shaft further has a plurality of flexible sectors 17 having outer toothing 20 extending along a longitudinal axis of the shaft. The outer toothing 20 can have a "pine tree bolt" configuration. However, the outer toothing 20 can also have other shapes such as a spiral without departing from the scope and intent of the present invention.

Referring now to FIG. 2, shaft 16 further comprises a traversing recess 32 which has a plurality of conical sectors 38 along a perimeter of the recess. The conical sectors taper into a lower, narrow region as shown in FIG. 1 to form a counter-catch 12. An inner taper or slot 35 is formed at a top surface of the recess 32 for receiving a lower member 2. The conical sectors 38 are illustrated in the right hand portion of FIG. 2 according to a first embodiment.

Alternately, referring to the left hand portion of FIG. 2, another preferred embodiment is shown. In this embodiment, the shaft 16 has the traversing recess 32 which has longitudinal ribs 40 extending inwardly toward a center of the recess. These ribs also taper into a lower, narrow region which forms counter catch 12. At a bottom end, the shaft 16 has a sloped region 19 formed below the flexible sector 17.

Referring now to FIGS. 3 and 4, the connecting element further comprises a lower member 2 in addition to upper member 1. The lower member 2 includes an upper closing flange 22 and a cylindrical portion 18 extending therefrom which has a catch region 15 at a lower end of the cylindrical portion. Closing flange 22 has on a top surface at least one engagement recess 26 which receives a disassembly tool (not shown). On a bottom surface, closing flange 22 has at least one counter tooth 21. For example, the counter teeth 21 can be diagonally opposed teeth. It should be appreciated that other configurations of teeth would fall within the scope and intent of the present invention. The counter toothing 12 of the lower member engages the center inner toothing 11 of the upper member.

Catch region 15 of lower member 2 includes a plurality of catch recesses 24 along a circumferential direction which are equally spaced between cylindrical sectors 28. Preferably, four cylindrical sectors 28 and four catch recesses 24 between the cylindrical sector are provided. Other arrangements of sectors and recesses can be used without departing from the scope and intent of the present invention.

In a lower portion of the lower member, below and adjacent catch area 15, a transition cone 30 includes a profile 33 which has a cross sectional area in the form of a cross and which adjoins a conical end 36. The conical end and cone are adjacent to and extend below the catch area 15 of lower member 2. An upper diameter of the conical end 36 corresponds to the diameter of the cylindrical region 18.

Referring now to FIG. 5, for a preassembled configuration, the lower member is inserted into the upper member such that an interior region of the transition cone 30 is located on a surface of the counter catch 12 of the upper member. In this position, flange 22 of the lower member extends above flange 10 of the upper member. Conical end 36 of lower member 2 and the centering slope 19 of shaft 16 of upper member 1 form in the preassembled configuration a common, undetachable, conically shaped insert unit which provides for easy installation during insertion into an opening of one or more support members (not shown). The openings of the support members can be arranged coaxially. It should be noted that this configuration can be used with other combinations of elements to be fastened together.

Referring now to FIGS. 5 and 6, to assemble the upper and lower members together, pressure is applied onto the closing flange 22 of the lower member until the closing flange 22 is embedded into a recess of flange 10 of the upper member and is generally flush with the flange 10. Then, the connecting element upper and lower members are connected with each other.

In a third preferred embodiment of the present invention, closing flange 22 of the lower member has at least one tooth 42 which is adapted to engage center inner toothing 11 of flange 10 of the upper member.

Referring again to FIG. 6, during final assembly of the upper and lower members, conical end 36, cross shape profile 33, and transition cone 30 protrude beyond an outer surface of shaft 16. In this position, catch recesses 24 of the lower member embed themselves into the corresponding counter-catches 12 of the upper member and secure the upper and lower members together. As is apparent from FIG. 6, flexible sector 17 of shaft 16 expands outwardly in the assembled configuration to secure the connecting element within an opening.

To disassemble the upper and lower members from each other, a disassembly tool (not shown) is inserted into engagement recess 26. The disassembly tool can for example could be a screwdriver or a coin which causes the lower member to rotate in a counter clockwise direction with respect to upper member. Movement in quarter rotation for example would bring into contact cooperating surfaces of counter tooth 21 of lower member 2 and inner toothing 11 of upper member 1. This causes a reverse movement in the longitudinal direction of the lower member and disengagement of the catch recess 24 from counter-catch 12. This results in the flexible sector 17 returning from the expanded position shown in FIG. 6 to the unexpanded position shown in FIG. 5. At this point, the entire connecting element can be removed from the support opening(s) by exerting a pulling force on flange 10 or flange 22. Thus, the connecting element can be removed from the support opening by pulling on only the lower member or by pulling on the upper member and lower member together.

The invention has been described above with reference to the preferred embodiments. Obviously, modifications and alterations will occur to others upon a reading and understanding the specification. The connecting element allows secure fastening inside of support opening, preassembly with undetachable parts as well as disassembly, which can be performed without resulting in destroying members of the connecting element. It is intended to include all such modifications and alterations insofar as they come within the scope of the appended claims or the equivalents thereof.

What is claimed is:

1. A connecting element for use between a support member of a motor vehicle body and a bearing member to be fixed onto the support member, said connecting element comprising:

an upper member which attaches to the bearing member and a lower member traversing said upper member where, in assembled position, at least a portion of the upper member is expanded within or behind an opening of the support member; the upper member including an upper flange and a shaft having outer toothed projections and a catch portion formed at a lower end of the shaft; and, the lower member including a catch recess at a lower end comprising cylindrical sectors having at least one catch recess interposed therebetween; wherein said catch portion of the upper member is embedded within said catch recess and said outer toothed projections engage said opening of said support member when said upper member and lower member are assembled together.

2. The connecting element of claim 1, wherein said upper member further comprises a shaft including slots along an outer end of said shaft, said slots comprise flexible sectors which have outer toothed projections, said shaft is disposed adjacent to said upper flange.

3. The connecting element of claim 2, wherein said shaft further comprises a recess within an inner portion of said shaft, said recess comprising a plurality of conical sectors which taper into said catch portion for receiving said lower member.

4. The connecting element of claim 1, wherein said lower member comprises an upper closing flange and at least one engagement recess within said upper closing flange for engaging an associated disassembly tool.

5. The connecting element of claim 4, wherein said lower member further comprises an elongated cylindrical portion adjacent to said upper closing flange.

6. The connecting element of claim 5, wherein said cylindrical portion comprises a catch area at a lower end, said catch area extends around a circumference of said cylindrical portion, and said catch area comprises at least one catch recess disposed between a plurality of cylindrical sectors.

7. The connecting element of claim 6, wherein said catch area comprises four cylindrical sectors and four catch recesses disposed between said cylindrical sectors.

8. The connecting element of claim 6, wherein said lower member further comprises a transition cone formed below said catch area, a cross sectional circular profile adjacent said cone, and a conical end positioned below said profile and cone.

9. A connecting element for use in connecting an associated bearing member with an associated support member, the connecting element comprising:

an upper member attachable to the bearing member and including an upper flange having central inner projections, a catch portion formed at a lower end of the upper member, and a shaft including longitudinal slots along an end of the shaft, the slots comprising flexible sectors which have outer projections, the shaft being disposed adjacent to said upper flange and wherein said shaft further includes a recess within an inner portion of said shaft, said recess including a plurality of longitudinal ribs disposed within said recess and extending toward a center of said shaft, and, a lower member operable with said upper member wherein, in an assembled position, at least a portion of the upper member is expanded within or behind an opening of the support member, the lower member including a counter-projections at an upper end and a catch area at a lower end comprising cylindrical sectors having at least one catch recess interposed therebetween, wherein said catch portion of the upper member is embedded within said catch recess and said counter-projections engage said inner projections when said upper member and lower member are assembled together in said assembled position and wherein said ribs form said catch portions for receiving said lower member.

10. The connecting element of claim 9, wherein said shaft includes a centering slope disposed adjacent said flexible sectors.

11. The connecting element of claim 10, wherein said conical end of said lower member and said centering slope of said shaft of said upper member are adapted to be preassembled to form said connecting element.

12. The connecting element of claim 11, wherein said lower member is adapted for insertion within an opening of said shaft to a position whereat said upper closing flange is received within a recess of said upper flange to form an assembled configuration.

13. The connecting element of claim 12, wherein said flexible sector is adapted to expand outwardly from said shaft when said upper and lower members are in the assembled configuration.

14. The connecting element of claim 11, wherein said connecting element is selectively removable from an associated support opening via one of the upper member and lower member.

15. A connecting element for use between an associated support member and an associated bearing member to be fixed onto the support member, said connecting element comprising:

an upper element which attaches to the bearing member and a lower member traversing said upper member;

said upper member including:
an upper flange having a central internal toothing,
a catch member formed at a lower end of said upper member, and
a shaft disposed below said upper flange and including a plurality of flexible sectors carrying a plurality of outer projections adapted to engage said associated support member; and, said lower member (2) comprises a catch area disposed below said counter toothing and cylindrical sectors with at least one catch recess (24) extending therebetween, said catch member of said upper member embedding, in an assembled position of said connecting element, into said catch recess.

16. The connecting element of claim 15, wherein said shaft further comprises a continuous recess disposed within an inner portion of said shaft, said recess comprises a plurality of conical sectors which form a narrow region forming said catch member which receives said lower member.

17. The connecting element of claim 15, wherein said shaft comprises at a lower end a centering slope.

18. The connecting element of claim 17, wherein said lower member comprises a conical end disposed at a lower end thereof, said conical end engages said centering slope of said shaft to form a preassembled connection element.

19. A connecting element for connecting an associated support member with an associated bearing member, said connecting element comprising:

an upper element adapted to attach to the bearing member and including: an upper flange having a central internal projection, a catch portion formed at a lower end of said upper member, and a shaft disposed below said upper flange, said shaft including a plurality of flexible sectors comprising outer projections wherein said shaft comprises on an inner surface a continuous recess comprising a plurality of longitudinal ribs which form a narrow area forming said counter catch; and, a lower member including: a counter projection and a catch area disposed below said counter projection and comprising cylindrical sectors with at least one catch recess extending therebetween, said catch portion of said upper member being embedded in an assembled position into said catch recess.

20. A connecting element for connecting an associated support member with an associated bearing, the connecting element comprising:

an upper member including:
an upper flange, a shaft extending from the upper flange and defining flexible sectors, the flexible sectors carrying a plurality of outer projections extending outwardly from the shaft, recess defined through an inner portion of said shaft, a counter catch member at a lower end of said shaft, and a counter catch member at a lower end of said shaft, said counter catch member being formed by a portion of said shaft tapering into said recess, and a lower member selectively receivable in said recess of said upper member, the lower member including:

an upper closing flange, and an elongated cylindrical leg having a major smooth upper area and a catch area at a lower end, said catch area comprising at least one catch recess adapted to receive said counter catch member of said upper member when the lower member is received within said recess to expand said flexible sectors outwardly from said shaft for securing said plurality of outer projections carried on said shaft against an opening formed in the associated support member to connect the associated support member with the associated bearing.

* * * * *